United States Patent
Suga et al.

(10) Patent No.: US 12,098,243 B2
(45) Date of Patent: *Sep. 24, 2024

(54) POLYETHER ETHER KETONE AND METHOD FOR PRODUCING POLYETHER ETHER KETONE

(71) Applicant: IDEMITSU KOSAN CO.,LTD., Tokyo (JP)

(72) Inventors: Koichi Suga, Sodegaura (JP); Minoru Senga, Sodegaura (JP); Hiromu Kumagai, Sodegaura (JP); Yuko Murakami, Ichihara (JP)

(73) Assignee: IDEMITSU KOSAN CO., LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/024,240

(22) PCT Filed: Sep. 2, 2021

(86) PCT No.: PCT/JP2021/032245
§ 371 (c)(1),
(2) Date: Mar. 1, 2023

(87) PCT Pub. No.: WO2022/050340
PCT Pub. Date: Mar. 10, 2022

(65) Prior Publication Data
US 2023/0265244 A1 Aug. 24, 2023

(30) Foreign Application Priority Data
Sep. 2, 2020 (JP) .................. 2020-147621

(51) Int. Cl.
*C08G 65/40* (2006.01)

(52) U.S. Cl.
CPC ..... *C08G 65/4012* (2013.01); *C08G 65/4093* (2013.01)

(58) Field of Classification Search
CPC ............ C08G 65/4087; C08G 65/40; C08G 65/4012; C08J 5/18; C08J 2371/10; C08K 7/06; C08K 7/14
See application file for complete search history.

(56) References Cited

U.S. PATENT DOCUMENTS

| | | | |
|---|---|---|---|
| 4,176,222 A | 11/1979 | Cinderey et al. |
| 4,952,665 A | 8/1990 | Ebata et al. |
| 4,954,604 A | 9/1990 | Genz et al. |
| 4,999,414 A | 3/1991 | Genz et al. |
| 5,053,477 A | 10/1991 | Kern et al. |
| 5,298,592 A | 3/1994 | Aumueller et al. |

FOREIGN PATENT DOCUMENTS

| | | |
|---|---|---|
| JP | S64-065129 A | 3/1989 |
| JP | H01-178520 A | 7/1989 |
| JP | H03-122120 A | 5/1991 |
| JP | 2013-500350 A | 1/2013 |
| WO | WO-2011/081080 A1 | 7/2011 |

OTHER PUBLICATIONS

International Search Report and Written Opinion issued in connection with PCT Appl. Ser. No. PCT/JP2021/032245 dated Nov. 16, 2021.
Office Action issued in corresponding Chinese Patent Application No. 202180057886.1, dated Aug. 15, 2023.
Japanese Patent Office, "Decision to Grant a Patent," issued in connection with Japanese Patent Application No. 2022-546963, dated Apr. 4, 2023.

*Primary Examiner* — Shane Fang
(74) *Attorney, Agent, or Firm* — Foley & Lardner LLP

(57) ABSTRACT

Provided is a polyether ether ketone, comprising a repeating unit represented by the following formula (1), the polyether ether ketone having a crystallization temperature Tc of 255° C. or more, and satisfying one or both of the following conditions (A) and (B): (A) a fluorine atom content a is less than 2 mg/kg; and (B) a chlorine atom content b is 2 mg/kg or more.

(1)

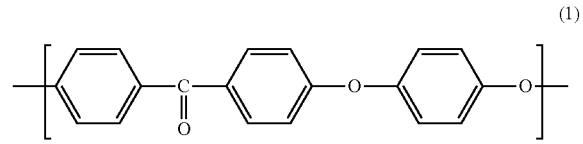

16 Claims, No Drawings

POLYETHER ETHER KETONE AND METHOD FOR PRODUCING POLYETHER ETHER KETONE

CROSS-REFERENCE TO RELATED APPLICATIONS

The present application claims priority under 35 U.S.C. § 371 to International Patent Application No. PCT/JP2021/032245, filed Sep. 2, 2021, which claims priority to and the benefit of Japanese Patent Application No. 2020-147621, filed on Sep. 2, 2020. The contents of these applications are hereby incorporated by reference in their entireties.

TECHNICAL FIELD

The present invention relates to a polyether ether ketone and a method for producing a polyether ether ketone.

Specifically, the present invention relates to a polyether ether ketone having a high crystallization temperature Tc and a method for producing a polyether ether ketone.

BACKGROUND ART

A polyether ether ketone (hereinafter, the polyether ether ketone is also referred to as "PEEK") has been known as a representative resin of an engineering plastic.

In general, 4,4'-difluorobenzophenone that is said to have high reactivity and hydroquinone have been used as raw materials at the time of the production of the PEEK.

Meanwhile, in Patent Literature 1, 4,4'-dichlorobenzophenone and hydroquinone are used as raw materials at the time of the production of the PEEK while the following condition is regarded as essential: a mixed solvent of 100 parts by mass of an aromatic sulfone and 1 part by mass to 20 parts by mass of a solvent having a boiling point of 270° C. to 330° C. is used.

In addition, in Patent Literature 2, 4,4'-dichlorobenzophenone and hydroquinone are used as raw materials at the time of the production of the PEEK while the following condition is regarded as essential: the production is performed in the presence of one or more of alkali metal fluorides selected from the group consisting of: sodium fluoride; potassium fluoride; rubidium fluoride; and cesium fluoride.

CITATION LIST

Patent Literature

[PTL 1] JP H03-122120 A
[PTL 2] JP S64-65129 A

SUMMARY OF INVENTION

Technical Problem

However, the related art typified by Patent Literatures 1 and 2 has been found to be susceptible to further improvement from the viewpoint of increasing the crystallization temperature Tc of the PEEK produced by a reaction between 4,4'-dichlorobenzophenone and hydroquinone.

One object of the present invention is to provide a polyether ether ketone having a high crystallization temperature Tc and a method for producing a polyether ether ketone.

The inventors of the present invention have made extensive investigations, and as a result, have found that a PEEK, which is produced by reacting 4,4'-dichlorobenzophenone and hydroquinone under a condition in which a highest temperature of a reaction mixture is 280° C. to 320° C., has a high crystallization temperature Tc. Thus, the inventors have completed the present invention.

According to the present invention, there can be provided the following polyether ether ketone and the like.

1. A polyether ether ketone, comprising a repeating unit represented by the following formula (1), having a crystallization temperature Tc of 255° C. or more, and satisfying one or both of the following conditions (A) and (B):

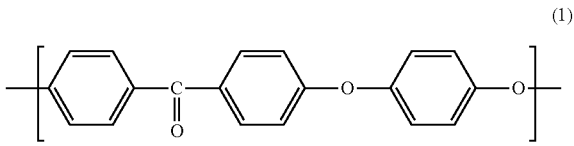

(1)

(A) a fluorine atom content a is less than 2 mg/kg; and
(B) a chlorine atom content b is 2 mg/kg or more.

2. The polyether ether ketone according to 1, wherein a raw material of the polyether ether ketone comprises 4,4'-dichlorobenzophenone.

3. The polyether ether ketone according to 1 or 2, having a melt flow index of 100 g/10 min or less.

4. The polyether ether ketone according to any one of 1 to 3, having a reduced viscosity $\eta_{sp}/c$ of 0.40 dl/g to 1.50 dl/g.

5. A method for producing a polyether ether ketone, which comprises reacting 4,4'-dichlorobenzophenone and hydroquinone under a condition in which a highest temperature of a reaction mixture is 260° C. to 320° C.

6. The method for producing a polyether ether ketone according to 5, further comprising increasing a temperature of the reaction mixture to 150° C. or more, followed by holding of the temperature.

7. The method for producing a polyether ether ketone according to 5 or 6, further comprising increasing a temperature of the reaction mixture to 150° C. or more, followed by repetition of an increase of the temperature and holding of the temperature a plurality of times.

8. The method for producing a polyether ether ketone according to any one of 5 to 7, further comprising holding the reaction mixture at 180° C. to 220° C. for 0.5 hour to 2 hours.

9. The method for producing a polyether ether ketone according to any one of 5 to 8, further comprising holding the reaction mixture at 230° C. to 270° C. for 0.5 hour to 2 hours.

10. The method for producing a polyether ether ketone according to any one of 5 to 9, further comprising holding the reaction mixture at 280° C. to 320° C. for 1 hour to 8 hours.

11. The method for producing a polyether ether ketone according to any one of 5 to 10, wherein a time period from a time point at which a temperature of the reaction mixture reaches 150° C. to a time point at which the temperature reaches the highest temperature is 2.0 hours to 10 hours.

12. The method for producing a polyether ether ketone according to any one of 5 to 11, wherein the polyether ether ketone to be produced has a crystallization temperature Tc of 255° C. or more.

13. The method for producing a polyether ether ketone according to any one of 5 to 12, wherein the polyether ether ketone to be produced has a melt flow index of 100 g/10 min or less.

14. The method for producing a polyether ether ketone according to any one of 5 to 13, wherein the polyether ether ketone to be produced has a reduced viscosity $\eta_{sp}/c$ of 0.40 dl/g to 1.00 dl/g.

15. The method for producing a polyether ether ketone according to any one of 5 to 14, wherein the highest temperature is more than 290° C.

16. The method for producing a polyether ether ketone according to any one of 5 to 15, wherein the reaction mixture contains only one kind of solvent as a solvent.

17. The method for producing a polyether ether ketone according to any one of 5 to 16, wherein the reaction mixture is free of any of sodium fluoride, potassium fluoride, rubidium fluoride, or cesium fluoride.

According to the present invention, the polyether ether ketone having a high crystallization temperature Tc and the method for producing a polyether ether ketone can be provided.

DESCRIPTION OF EMBODIMENTS

A polyether ether ketone and a method for producing a polyether ether ketone of the present invention are described in detail below.

The expression ""x" to "y"" as used herein represents the numerical range of "from "x" or more to "y" or less." An upper limit value and a lower limit value described for the numerical range may be arbitrarily combined.

In addition, two or more embodiments that are not contrary to each other out of the individual embodiments of an aspect according to the present invention to be described below may be combined, and an embodiment in which the two or more embodiments are combined is also an embodiment of the aspect according to the present invention.

1. Polyether Ether Ketone

A PEEK according to one aspect of the present invention comprises a repeating unit represented by the following formula (1), has a crystallization temperature Tc of 255° C. or more, and satisfies one or both of the following conditions (A) and (B):

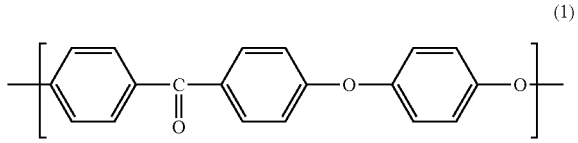

(1)

(A) a fluorine atom content a is less than 2 mg/kg; and
(B) a chlorine atom content b is 2 mg/kg or more.

The PEEK according to this aspect exhibits the following effect: the PEEK has a high crystallization temperature Tc and is excellent in mechanical strength such as tensile strength. Accordingly, the PEEK according to this aspect is suitably used in an application where mechanical strength is required.

In one embodiment, the crystallization temperature Tc of the PEEK is 255° C. or more, 256° C. or more, 257° C. or more, 258° C. or more, 259° C. or more, or 260° C. or more. When the PEEK has such high crystallization temperature Tc, at the time of, for example, the processing (e.g., molding with a mold) of a molten PEEK, a temperature holding time for sufficiently advancing the crystallization thereof can be shortened, and hence a molding cycle can be shortened. Thus, the productivity of a processed product (e.g., a molded body) is improved, the processability of the processed product becomes excellent, and a characteristic as a crystalline resin can be satisfactorily imparted to the processed product.

The upper limit of the crystallization temperature Tc of the PEEK is not particularly limited, and may be, for example, 300° C. or less, 295° C. or less, 290° C. or less, 285° C. or less, or 280° C. or less. Thus, at the time of, for example, the processing of the molten PEEK, the crystallization thereof can be suitably prevented from starting during the processing (e.g., during the loading thereof into the mold). In addition, a molding temperature (e.g., the temperature of the mold) can be reduced.

The crystallization temperature Tc of the PEEK is preferably 260° C. or more. In addition, the crystallization temperature Tc of the PEEK is, for example, 255° C. to 300° C., preferably 258° C. to 290° C., more preferably 260° C. to 280° C.

The crystallization temperature Tc of the PEEK is a value measured by differential scanning calorimetry (DSC) described in Examples.

The fluorine atom content a and chlorine atom content b of the PEEK are values measured by combustion ion chromatography described in Examples.

In one embodiment, the fluorine atom content a of the PEEK is less than 2 mg/kg. Thus, the effect of the present invention is satisfactorily exhibited. The lower limit of the content is not particularly limited, and may be, for example, 0 mg/kg.

Herein, the fluorine atom content a is the sum of the content a1 of a fluorine atom incorporated into the molecular structure of the PEEK and the content a2 of a fluorine atom incorporated as a component (free component) that is not incorporated into the molecular structure of the PEEK.

In one embodiment, the fluorine atom content a of the PEEK can be set to less than 2 mg/kg by refraining from the use of a fluorine atom-containing raw material (e.g., 4,4'-difluorobenzophenone) at the time of the synthesis of the PEEK, or by reducing the usage amount of the fluorine atom-containing raw material at the time of the synthesis of the PEEK.

In one embodiment, the free component in the fluorine atom content a2 is one or both of potassium fluoride and 4,4'-difluorobenzophenone.

In one embodiment, the chlorine atom content b of the PEEK is 2 mg/kg or more, 10 mg/kg or more, 100 mg/kg or more, 500 mg/kg or more, 700 mg/kg or more, 1,000 mg/kg or more, 2,000 mg/kg or more, 3,000 mg/kg or more, or 4,000 mg/kg or more. Thus, the effect of the present invention is satisfactorily exhibited. The upper limit of the content is not particularly limited, and may be, for example, 10,000 mg/kg or less, 9,000 mg/kg or less, 8,000 mg/kg or less, 7,000 mg/kg or less, or 6,000 mg/kg or less.

In addition, the chlorine atom content b of the PEEK is, for example, 2 mg/kg to 10,000 mg/kg, preferably 700 mg/kg to 9,000 mg/kg, more preferably 1,000 mg/kg to 8,000 mg/kg.

Herein, the chlorine atom content b is the sum of the content b1 of a chlorine atom incorporated into the molecular structure of the PEEK and the content b2 of a chlorine atom incorporated as a component (free component) that is not incorporated into the molecular structure of the PEEK.

In one embodiment, the chlorine atom content b of the PEEK can be set to 2 mg/kg or more by incorporating 4,4'-dichlorobenzophenone as a raw material at the time of the synthesis of the PEEK. In addition, the chlorine atom content b of the PEEK can be increased in the range of 2 mg/kg or more by using 4,4'-dichlorobenzophenone and hydroquinone as raw materials at the time of the synthesis of the PEEK, and increasing the ratio of the usage amount of 4,4'-dichlorobenzophenone to the usage amount of hydroquinone.

In one embodiment, the chlorine atom content b1 is 0 mg/kg or more, 100 mg/kg or more, 200 mg/kg or more, or 400 mg/kg or more. The upper limit of the content is not particularly limited, and may be, for example, 10,000 mg/kg or less, 9,000 mg/kg or less, 8,000 mg/kg or less, or 7,000 mg/kg or less.

In one embodiment, the chlorine atom content b2 is 0 mg/kg or more, 2 mg/kg or more, 5 mg/kg or more, or 10 mg/kg or more. The upper limit of the content is not particularly limited, and may be, for example, 500 mg/kg or less, 400 mg/kg or less, or 300 mg/kg or less.

In one embodiment, the free component in the chlorine atom content b2 is one or both of potassium chloride and 4,4'-dichlorobenzophenone.

The amount of a chlorine atom incorporated as potassium chloride, which is a free component, into the PEEK is determined by the following method.

<Method for Measuring Amount of Chlorine Atom Incorporated as Potassium Chloride, Which is Free Component, Into PEEK>

A solid sample (PEEK) is pulverized with a blender, and is washed with acetone and water in the stated order, followed by drying with an explosion-proof dryer at 180° C. When a reaction mixture (product) immediately after a reaction for the production of the PEEK is used as a sample, the product is cooled and solidified after the completion of the reaction to be used as the solid sample. The blender to be used is not particularly limited, and for example, 7010HS manufactured by Waring may be used.

About 1 g of the dried sample is weighed, and 100 ml (l: liter) of ultrapure water is added to the sample. The mixture is stirred at a liquid temperature of 50° C. for 20 minutes, and is left standing to cool. After that, the mixture is filtered to be separated into a solid content and an aqueous solution. The aqueous solution is analyzed by ion chromatography, and the amount of a chloride ion in the aqueous solution is determined on the basis of a calibration curve produced from a reference having a known concentration. Conditions for an ion chromatograph are as described below.

<Ion Chromatograph>
Analyzer: Metrohm 940 IC Vario
Column: A guard column (Metrosep A Supp 5 Guard) and a separation column (Metrosep A Supp 4) are used while being linked to each other (both the columns are manufactured by Metrohm AG).
Eluent: $Na_2CO_3$ (1.8 mmol/l)+$NaHCO_3$ (1.7 mmol/l)
Flow rate: 1.0 ml/min
Column temperature: 30° C.
Measurement mode: A suppressor system
Detector: An electric conductivity detector The amount of a chlorine atom incorporated as 4,4'-dichlorobenzophenone, which is a free component, into the PEEK is determined by the following method.

<Method for Measuring Amount of Chlorine Atom Incorporated as 4,4'-Dichlorobenzophenone, Which is Free Component, Into PEEK>

A solid sample (PEEK) is pulverized with a blender, and is washed with acetone and water in the stated order, followed by drying with an explosion-proof dryer at 180° C. When a reaction mixture (product) immediately after a reaction for the production of the PEEK is used as a sample, the product is cooled and solidified after the completion of the reaction to be used as the solid sample. The blender to be used is not particularly limited, and for example, 7010HS manufactured by Waring may be used.

About 1 g of the dried sample is weighed in a recovery flask, and 10 ml of acetone and a boiling stone are added thereto, followed by heating to reflux in a water bath for 5 hours. The mixture is left standing to cool to room temperature, and then its solid content is removed by filtration. The resultant acetone solution is evaporated to dryness with an evaporator, and then 10 ml of acetone is added with a volumetric pipette to redissolve the residue. The amount (mg/kg) of 4,4'-dichlorobenzophenone in the sample is calculated by subjecting the solution to measurement by gas chromatography. The amount (mg/kg) of the chlorine atom incorporated as 4,4'-dichlorobenzophenone, which is a free component, into the PEEK is converted from the following calculation equation.

Amount (mg/kg) of chlorine atom incorporated as 4,4'-dichlorobenzophenone, which is free component, into PEEK=amount (mg/kg) of 4,4'-dichlorobenzophenone in sample/251.11 (molecular weight of 4,4'-dichlorobenzophenone)×35.45 (atomic weight of chlorine)×2

The quantitative value of 4,4'-dichlorobenzophenone is determined on the basis of a calibration curve produced from a reference having a known concentration. Measurement conditions are described below.

<Gas Chromatograph>
Analyzer: Agilent Technologies 7890B
GC column: Agilent Technologies DB-5MS (length: 30 m, inner diameter: 0.25 mm, thickness: 0.25 μm)
Inlet temperature: 250° C.
Oven temperature: 100° C. (1 min)→30° C./min→250° C. (10 min)
Flow rate: 1 ml/min
Injection amount: 1 μl
Split ratio: 40:1
Detector: FID
Detector temperature: 250° C.

The repeating unit represented by the formula (1) is a linked body of a structural unit represented by the following formula (2) and a structural unit represented by the following formula (3).

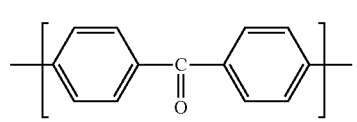

(2)

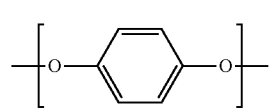

(3)

In the PEEK according to one embodiment, the structural unit represented by the formula (2) is arranged at each of one or more terminals of its molecular chain. In this case, a terminal structure bonded to the structural unit may be a chlorine atom (Cl).

In the PEEK according to one embodiment, the structural unit represented by the formula (3) is arranged at each of one or more terminals of its molecular chain. In this case, a terminal structure bonded to the structural unit may be, for example, a hydrogen atom (H) (when the terminal structure is the hydrogen atom (H), the atom forms a hydroxy group with an oxygen atom (O) in the structural unit).

The terminal structure of the PEEK may be, for example, a structure obtained by substituting the above-mentioned chlorine atom (Cl) or hydroxy group with a hydrogen atom (H) or the like. The terminal structure is not limited to those examples, and may be any structure.

In one embodiment, the PEEK is free of any structural unit other than the repeating unit represented by the formula (1), provided that the PEEK may have a terminal structure at a terminal of its molecular chain as described above.

In one embodiment, the PEEK is free of any structural unit other than the structural units represented by the formula (2) and the formula (3), provided that the PEEK may have a terminal structure at a terminal of its molecular chain as described above.

In one embodiment, the PEEK comprises any structural unit other than the structural units represented by the formula (2) and the formula (3) to the extent that the effect of the present invention is not impaired.

In one embodiment, the total ratio (mass %) of the structural units represented by the formula (2) and the formula (3) in all monomers to be subjected to a reaction is 50 mass % or more, 60 mass % or more, 70 mass % or more, 80 mass % or more, 90 mass % or more, 95 mass % or more, 97 mass % or more, 99 mass % or more, 99.5 mass % or more, or 100 mass % with respect to all the monomers.

In one embodiment, a molar ratio ([1A]:[2A]) between the structural unit represented by the formula (2) and the structural unit represented by the formula (3) in the PEEK is 47.5:52.5 to 52.5:47.5, 48.0:52.0 to 52.0:48.0, 48.5:51.5 to 51.5:48.5, 49.0:51.0 to 51.0:49.0, or 49.5:50.5 to 50.5:49.5.

The number of moles of the structural unit represented by the formula (2) may be larger than, smaller than, or identical to the number of moles of the structural unit represented by the formula (3).

When the total ratio of the structural units represented by the formula (2) and the formula (3) in all the monomers for forming the PEEK is 100 mass %, the above-mentioned molar ratio is typically 1.1.

In one embodiment, the melt flow index (abbreviation: "MI": identical in meaning to a melt flow rate (abbreviation: "MFR") described in ASTM D 1238-13) of the PEEK is 1,500 g/10 min or less, 1,000 g/10 min or less, 500 g/10 min or less, 300 g/10 min or less, 200 g/10 min or less, 100 g/10 min or less, 80 g/10 min or less, or 60 g/10 min or less, and is 0.0001 g/10 min or more, 0.0005 g/10 min or more, or 0.001 g/10 min or more.

In addition, the melt flow index of the PEEK is, for example, 0.0001 g/10 min to 1,500 g/10 min, preferably 0.0005 g/10 min to 500 g/10 min, more preferably 0.001 g/10 min to 100 g/10 min.

The melt flow index of the PEEK is preferably 100 g/10 min or less. The PEEK having a melt flow index of 100 g/10 min or less is sufficiently increased in molecular weight, and hence pelletization with, for example, an extruder may be preferably applied thereto.

The melt flow index of the PEEK is a value measured by a method described in Examples.

The melt flow index of the PEEK can be adjusted by the temperature conditions (e.g., the highest temperature, a temperature holding time, and a rate of temperature increase) of the reaction mixture, and the ratios of raw materials (e.g., 4,4'-dichlorobenzophenone and hydroquinone) in the reaction mixture.

The melt flow index of the PEEK may also be measured by the following measurement method, and even when the measurement is performed by the measurement method, a preferred range and the like are as described above.

The melt flow index of the PEEK is measured with a melt indexer (L-220) manufactured by Tateyama Kagaku High-Technologies Co., Ltd. in conformity with JIS K 7210-1: 2014 (ISO 1133-1:2011) under the following measurement conditions.

[Measurement Conditions]
Measurement temperature (resin temperature): 380° C.
Measurement load: 2.16 kg
Cylinder inner diameter: 9.550 mm
Die inner diameter: 2.095 mm
Die length: 8.000 mm
Piston head length: 6.35 mm
Piston head diameter: 9.474 mm
Piston weight: 110.0 g (The above-mentioned measurement load comprises the piston weight.)
Operation:

The sample is dried at 150° C. for 2 hours or more in advance. The sample is loaded into the cylinder, and the piston is inserted thereinto, followed by preheating for 6 minutes. The load is applied to the cylinder, and a piston guide is removed, followed by the extrusion of a molten sample from the die. The sample is cut out when the piston moves by a distance in a predetermined range and a predetermined time (t [s]) passes after the start of the movement, and the weight of the sample is measured (m [g]). The MI thereof is determined from the following equation: MI [g/10 min]=600/t×m.

In one embodiment, the reduced viscosity $\eta_{sp}/c$ of the PEEK is 0.34 dl/g or more, 0.36 dl/g or more, more than 0.36 dl/g, 0.37 dl/g or more, 0.38 dl/g or more, 0.39 dl/g or more, 0.40 dl/g or more, 0.46 dl/g or more, or 0.48 dl/g or more, and is 1.50 dl/g or less, 1.30 dl/g or less, or 1.20 dl/g or less.

In addition, a suitable range of the reduced viscosity $\eta_{sp}/c$ of the PEEK is, for example, 0.36 dl/g to 1.50 dl/g, more than 0.36 dl/g and 1.50 dl/g or less, 0.37 dl/g to 1.50 dl/g, 0.40 dl/g to 1.50 dl/g, 0.46 dl/g to 1.30 dl/g, or 0.48 dl/g to 1.20 dl/g. Thus, a molding material showing sufficient strength while securing appropriate melting fluidity at the time of its molding is obtained.

The reduced viscosity $\eta_{sp}/c$ of the PEEK is a value measured by a method described in Examples. In the method described in Examples, the concentration of the PEEK in a sulfuric acid solution (sample solution) for measurement is 0.1 g/dl.

The reduced viscosity $\eta_{sp}/c$ of the PEEK can be adjusted by the temperature conditions (e.g., the highest temperature, a temperature holding time, and a rate of temperature increase) of the reaction mixture, and the ratios of raw materials (e.g., 4,4'-dichlorobenzophenone and hydroquinone) in the reaction mixture. The same holds true for the following reduced viscosity $\eta'_{sp}/c$.

The reduced viscosity $\eta_{sp}/c$ of the PEEK may also be measured by the following measurement method, and even when the measurement is performed by the measurement method, a preferred range and the like are as described above.

The PEEK is dried in a vacuum at 120° C. for 6 hours. Next, the PEEK is dissolved in concentrated sulfuric acid (purity: 98 mass %), and a sample solution is prepared in a measuring flask so that the concentration C [g/dl] of the PEEK may be 0.1 g/dl. Next, the flow time to [s] of the solvent (concentrated sulfuric acid (purity: 98 mass %)) and the flow time t [s] of the sample solution are measured in conformity with JIS K 7367-5:2000 (ISO 1628-5:1998) with a thermobath at 25° C. (thermostat for kinematic viscosity measurement (TV-5S manufactured by Thomas Kagaku Co., Ltd.)) and an Ubbelohde viscometer (No. 2), and the reduced viscosity $\eta_{sp}/c$ is determined from the following equation: reduced viscosity $\eta_{sp}/c$ [dl/g]=$(t-t_0)/(t_0 \times C)$.

In one embodiment, the PEEK has a reduced viscosity $\eta'_{sp}/c$ (not the reduced viscosity $\eta_{sp}/c$ measured by the method described in Examples), which is measured at 25° C. for a sulfuric acid solution (sample solution) obtained by dissolving the PEEK in concentrated sulfuric acid at a concentration of 0.5 g/dl, of more than 0.36 dl/g, 0.37 dl/g or more, 0.38 dl/g or more, 0.39 dl/g or more, 0.40 dl/g or more, 0.46 dl/g or more, 0.48 dl/g or more, 0.50 dl/g or more, or 0.52 dl/g or more, and 1.50 dl/g or less, 1.30 dl/g or less, or 1.20 dl/g or less.

A suitable range of the reduced viscosity $\eta'_{sp}/c$ of the PEEK is, for example, more than 0.36 dl/g and 1.50 dl/g or less, 0.37 dl/g to 1.50 dl/g, 0.40 dl/g to 1.50 dl/g, 0.46 dl/g to 1.30 dl/g, or 0.48 dl/g to 1.20 dl/g. Thus, a molding material showing sufficient strength while securing appropriate melting fluidity at the time of its molding is obtained.

The reduced viscosity of the PEEK tends to increase as the concentration of the PEEK in the sample solution for measurement becomes higher. For example, when measurement is performed for the same PEEK, the value of its reduced viscosity $\eta'_{sp}/c$ (PEEK concentration: 0.5 g/dl) tends to be larger than the value of its reduced viscosity $\eta_{sp}/c$ (PEEK concentration: 0.1 g/dl). For example, when the reduced viscosity $\eta_{sp}/c$ of the PEEK is 0.36 dl/g, the reduced viscosity $\eta'_{sp}/c$ thereof is assumed to be larger than 0.36 dl/g.

In one embodiment, the intrinsic viscosity $\eta_{inh}$ of the PEEK is 0.47 dl/g or more, 0.48 dl/g or more, 0.49 dl/g or more, or 0.50 dl/g or more, and is 2.00 dl/g or less, 1.80 dl/g or less, 1.50 dl/g or less, 1.30 dl/g or less, or 1.20 dl/g or less.

In addition, a suitable range of the intrinsic viscosity hint, of the PEEK is, for example, 0.47 dl/g to 2.00 dl/g, 0.47 dl/g to 1.50 dl/g, 0.48 dl/g to 1.30 dl/g, or 0.50 dl/g to 1.20 dl/g. Thus, a molding material showing sufficient strength while securing appropriate melting fluidity at the time of its molding is obtained.

The intrinsic viscosity $\eta_{inh}$ of the PEEK is a value measured by the following measurement method.

The PEEK is dried in a vacuum at 120° C. for 6 hours. Next, the PEEK is dissolved in concentrated sulfuric acid (purity: 95 mass % or more), and a plurality of sample solutions in which the concentration C [g/dl] of the PEEK is changed are obtained. After that, the flow time to [s] of the solvent (concentrated sulfuric acid (purity: 95 mass % or more)) and the flow time t [s] of the sample solution are measured in conformity with JIS K 7367-5:2000 (ISO 1628-5:1998) with a thermobath at 25° C. (thermostat for kinematic viscosity measurement (TV-5S manufactured by Thomas Kagaku Co., Ltd.)) and an Ubbelohde viscometer (No. 2), and the reduced viscosity $\eta_{sp}/c$ is determined from the following equation: reduced viscosity $\eta_{sp}/c$ [dl/g]=$(t-t_0)/(t_0 \times C)$.

A linear correlation equation is determined by performing two-dimensional plotting in which an axis of abscissa indicates the concentration C [g/dl] of each of the sample solutions and an axis of ordinate indicates the reduced viscosity $\eta_{sp}/c$. The value of the reduced viscosity $\eta_{sp}/c$ at a concentration of zero (intercept) can be determined as the intrinsic viscosity $\eta_{inh}$.

The intrinsic viscosity $\eta_{inh}$ of the PEEK can be adjusted by the temperature conditions (e.g., the highest temperature, a temperature holding time, and a rate of temperature increase) of the reaction mixture, and the ratios of raw materials (e.g., 4,4'-dichlorobenzophenone and hydroquinone) in the reaction mixture.

In one embodiment, the tensile strength of the PEEK is 48 MPa or more, 50 MPa or more, 52 MPa or more, 54 MPa or more, 56 MPa or more, 58 MPa or more, 60 MPa or more, 62 MPa or more, 64 MPa or more, or 66 MPa or more. Thus, the PEEK may be more suitably used in an application where mechanical strength is required. The upper limit of the strength is not particularly limited, and is, for example, 200 MPa or less, 150 MPa or less, or 100 MPa or less.

The tensile strength of the PEEK is, for example, 48 MPa to 200 MPa, preferably 54 MPa to 150 MPa, more preferably 60 MPa to 100 MPa.

The tensile strength of the PEEK is a value measured by a method described in Examples.

For example, a pellet comprising the PEEK according to this aspect may be produced by using the PEEK. The pellet may be used as various molding materials requiring heat resistance, solvent resistance, an insulating property, and the like. A molded body may be produced through use of the pellet by a molding method such as injection molding with a mold. In addition, a molded body may be produced through use of the pellet by a molding method, such as extrusion molding, press molding, sheet molding, or film molding.

The applications of the PEEK according to this aspect are not particularly limited. The PEEK is suitable in, for example, aerospace applications, sliding members, such as a gear and a bearing, and various resin compositions.

A molded body comprising the PEEK according to this aspect is suitable as, for example, an aerospace molded body, a molded body for a sliding member, or a filament for a 3D printer. In addition, the molded body comprising the PEEK is suitable as, for example, an aerospace injection-molded body or an injection-molded body for a sliding member.

2. Method for producing Polyether Ether Ketone

A method for producing a PEEK according to one aspect of the present invention comprises reacting 4,4'-dichlorobenzophenone and hydroquinone under a condition in which a highest temperature of a reaction mixture is 260° C. to 320° C.

The method for producing a PEEK according to this aspect enables the production of a PEEK having a high crystallization temperature Tc. Although the reason for the foregoing is not necessarily clear, the following is assumed to be one reason. Typically, 4,4'-dichlorobenzophenone to be used as a monomer has low reactivity, and a side reaction due to a radical reaction is liable to advance. However, the optimization of a temperature condition or the like may suppress the side reaction due to the radical reaction and enable, for example, suitable advance of a nucleophilic substitution reaction (as a result of the nucleophilic substitution reaction, 4,4'-dichlorobenzophenone and hydroquinone are bonded to each other through an ether bond). The foregoing is assumed to be one reason why the PEEK having a high crystallization temperature Tc can be produced. The PEEK produced by the method for producing a PEEK according to this aspect may be the above-mentioned PEEK according to one aspect of the present invention.

4,4'-Dichlorobenzophenone and hydroquinone are monomers for polymerizing a PEEK.

Through a step of reacting 4,4'-dichlorobenzophenone and hydroquinone, the PEEK can be obtained as a copolymer of these compounds (monomer units).

4,4'-Dichlorobenzophenone and hydroquinone can be easily synthesized, and commercial products are also available.

The term "reaction mixture" as used herein refers to a reaction system from the start of the reaction between 4,4'-dichlorobenzophenone and hydroquinone to the completion of the reaction, and preferably refers to the form of a solution containing a solvent to be described later in addition to these monomers. The composition of the reaction mixture may vary along with the advance of the reaction. Typically, along with the advance of the reaction, the concentrations of the reactants (4,4'-dichlorobenzophenone and hydroquinone) in the reaction mixture reduce, and hence the concentration of the product (PEEK) increases.

The "highest temperature" of the reaction mixture as used herein is the highest temperature (highest temperature reached) reached by the reaction mixture during the start to the completion of the reaction between 4,4'-dichlorobenzophenone and hydroquinone.

In one embodiment, the highest temperature of the reaction mixture may be 260° C. or more, 265° C. or more, 270° C. or more, 275° C. or more, 280° C. or more, 285° C. or more, 290° C. or more, more than 290° C., or 295° C. or more, and may be 320° C. or less, 315° C. or less, 310° C. or less, or 305° C. or less. As the highest temperature of the reaction mixture becomes closer to 300° C. in the ranges, the following effect is obtained: the molecular weight of the PEEK to be produced increases (in other words, the melt flow index of the PEEK to be produced reduces). The highest temperature of the reaction mixture is, for example, 260° C. to 320° C., preferably more than 290° C. and 320° C. or less, more preferably 295° C. to 315° C.

The highest temperature of the reaction mixture is not limited to the above-mentioned examples, and may be, for example, less than 300° C., 295° C. or less, 290° C. or less, 285° C. or less, 280° C. or less, 275° C. or less, 270° C. or less, or 265° C. or less, or may be more than 300° C., 305° C. or more, 310° C. or more, or 315° C. or more. In those ranges, even when an increasing effect on the molecular weight of the PEEK is hardly obtained, the following effect is obtained: the crystallization temperature Tc thereof increases and the tensile strength thereof is improved.

In one embodiment, the method for producing a PEEK according to this aspect comprises increasing the temperature of the reaction mixture to 150° C. or more, followed by the holding of the temperature. A temperature at the time of the temperature holding is not particularly limited, and may be, for example, 150° C. to 320° C. The time period for which the temperature holding is performed is not particularly limited, and may be, for example, 0.1 hour to 12 hours.

In one embodiment, the method for producing a PEEK according to this aspect comprises increasing the temperature of the reaction mixture to 150° C. or more, followed by the performance of the increase of the temperature and the holding of the temperature once each, or comprises increasing the temperature thereof to 150° C. or more, followed by the repetition of the temperature increase and the temperature holding a plurality of times. The number of times of repetition is not particularly limited, and may be, for example, 2, 3, 4, 5, 6, 7, 8, 9, or 10.

When the temperature increase and the temperature holding are repeated a plurality of times, the reaction can be efficiently advanced.

In one embodiment, the method for producing a PEEK according to this aspect comprises holding the reaction mixture at 180° C. to 220° C. for 0.5 hour to 2 hours, preferably 0.6 hour to 1.8 hours, more preferably 0.7 hour to 1.5 hours (hereinafter also referred to as "temperature holding (i)"). Thus, the reaction can be accelerated while the volatilization of the raw materials is suppressed, and hence a PEEK having a higher molecular weight can be obtained.

In one embodiment, the method for producing a PEEK according to this aspect comprises holding the reaction mixture at 230° C. to 270° C. for 0.5 hour to 2 hours, preferably 0.6 hour to 1.8 hours, more preferably 0.7 hour to 1.5 hours (hereinafter also referred to as "temperature holding 00"). Thus, the reaction can be accelerated while the volatilization of the raw materials is suppressed, and hence a PEEK having a higher molecular weight can be obtained.

In one embodiment, the method for producing a PEEK according to this aspect comprises holding the reaction mixture at 280° C. to 320° C. for 1 hour to 8 hours, preferably 1 hour to 6 hours, more preferably 1 hour to 4 hours (hereinafter also referred to as "temperature holding (iii)"). Thus, a PEEK having a desired molecular weight can be obtained.

In one embodiment, the method for producing a PEEK according to this aspect may comprise two or three selected from the group consisting of the above-mentioned temperature holdings (i) to (iii). The two or three temperature holdings are preferably performed in order of increasing temperature. The method may comprise increasing the temperature of the reaction mixture between the two or three temperature holdings.

A rate of temperature increase when the temperature of the reaction mixture is increased is not particularly limited, and may be, for example, 0.1° C./min to 15° C./min, 0.1° C./min to 10° C./min, 0.1° C./min to 5° C./min, or 0.1° C./min to 3° C./min. Thus, the reaction can be accelerated while the volatilization of the raw materials is suppressed, and hence a PEEK having a higher molecular weight can be obtained.

In one embodiment, in the method for producing a PEEK according to this aspect, a time period from a time point at which the temperature of the reaction mixture reaches 150° C. to a time point at which the temperature reaches the highest temperature is 2.0 hours to 10 hours.

In one embodiment, the reaction mixture contains a solvent. The reaction mixture containing the solvent may be in the form of a solution. The solution may contain 4,4'-dichlorobenzophenone and hydroquinone dissolved in the solvent.

The solvent is not particularly limited, and for example, a neutral polar solvent may be used. Examples of the neutral polar solvent include N,N-dimethylformamide, N,N-diethylformamide, N,N-dimethylacetamide, N,N-diethylacetamide, N,N-dipropylacetamide, N,N-dimethylbenzamide, N-methyl-2-pyrrolidone, N-ethyl-2-pyrrolidone, N-isopropyl-2-pyrrolidone, N-isobutyl-2-pyrrolidone, N-n-propyl-2-pyrrolidone, N-n-butyl-2-pyrrolidone, N-cyclohexyl-2-pyrrolidone, N-methyl-3-methyl-2-pyrrolidone, N-ethyl-3-methyl-2-pyrrolidone, N-methyl-3,4,5-trimethyl-2-pyrrolidone, N-methyl-2-piperidone, N-ethyl-2-piperidone, N-isopropyl-2-piperidone, N-methyl-6-methyl-2-piperidone, N-methyl-3-ethylpiperidone, dimethyl sulfoxide, diethyl sulfoxide, 1-methyl-1-oxosulfolane, 1-ethyl-1-oxosulfolane, 1-phenyl-1-oxosulfolane, N,N'-dimethylimidazolidinone, and diphenyl sulfone.

In one embodiment, the reaction mixture contains an aromatic sulfone, and the content of a solvent having a boiling point of 270° C. to 330° C. in the mixture is 0 parts by mass or more and less than 1 part by mass with respect to 100 parts by mass of the aromatic sulfone. Thus, it becomes easier to control a reaction temperature.

The reaction mixture may contain one or two or more of solvents. In particular, the reaction mixture preferably contains only one kind of solvent (single solvent) as a solvent. Thus, a process for the production of the PEEK can be simplified.

In one embodiment, the reaction mixture contains potassium carbonate. Thus, the reaction is accelerated.

In one embodiment, the potassium carbonate satisfies at least one of the following condition (A) and (B). Thus, the molecular weight of the PEEK to be obtained can be increased:

(A) the bulk density of the potassium carbonate is 1.2 g/ml (l: liter) or less; and (B) an average particle diameter D (μm) and a specific surface area S (m$^2$/g) of the potassium carbonate satisfy D/S600.

In one embodiment, the bulk density of the potassium carbonate is 1.2 g/ml or less, 1.1 g/ml or less, or 1.0 g/ml or less, and is 0.05 g/ml or more, or 0.10 g/ml or more.

In addition, the bulk density of the potassium carbonate may be, for example, 0.05 g/ml to 1.2 g/ml, 0.05 g/ml to 1.1 g/ml, 0.05 g/ml to 1.0 g/ml, 0.10 g/ml to 1.2 g/ml, 0.10 g/ml to 1.1 g/ml, or 0.10 g/ml to 1.0 g/ml.

When the bulk density of the potassium carbonate is 1.2 g/ml or less, the molecular weight of the PEEK to be obtained can be increased.

The bulk density of the potassium carbonate is a value measured by the following method.

About 50 g of the potassium carbonate (mass: m (g)) weighed with an accuracy of 0.1 mass % is gently loaded into a 100-milliliter measuring cylinder (minimum scale unit: 1 ml), which has been dried, without being consolidated. The upper surface of a powder layer is carefully leveled without being consolidated, and the loose bulk volume $V_0$ (ml) thereof is read to the minimum scale unit, followed by the calculation of the bulk density from the following equation.

Bulk density (g/ml)=$m/V_0$

When the loose bulk volume $V_0$ is more than 100 ml, the loose bulk volume $V_0$ is adjusted to a volume of 100 ml or less by reducing the mass m of the potassium carbonate to be used as a sample, and the loose bulk volume $V_0$ is read, followed by the calculation of the bulk density.

In one embodiment, when the average particle diameter and specific surface area of the potassium carbonate are represented by D (μm) and S (m$^2$/g), respectively, the value of the ratio D/S is 600 or less, 550 or less, or 500 or less, and is 0.1 or more, 0.2 or more, or 0.5 or more.

In addition, the value of the ratio D/S may be, for example, 1 to 600, 1 to 550, 1 to 500, 2 to 600, 2 to 550, 2 to 500, 5 to 600, 5 to 550, or 5 to 500.

When D/S≤600 is satisfied, the molecular weight of the PEEK to be obtained can be increased.

The average particle diameter D (μm) of the potassium carbonate is a value measured by a method described below.

Particle size distribution measurement is performed with CAMSIZER manufactured by MicrotracBEL Corp. by a dry method. The sample (potassium carbonate) is dropped into the measuring portion of the CAMSIZER with a vibrating feeder, and a picture of its particles is taken with a camera, followed by the measurement of their particle diameters. When an observed image is processed, the average particle diameter D is calculated through use of numerical values, which are obtained by processing data from the short diameters of the particle image, through automatic calculation by a program installed in the measuring apparatus.

The specific surface area S (m$^2$/g) of the potassium carbonate is measured by a method described below.

(i) Pretreatment

As the pretreatment of the sample (potassium carbonate), heat-vacuum evacuation is performed with BELPREP vacll manufactured by MicrotracBEL Corp. at 100° C. for 1 hour or more. When a degree of vacuum of 10 Pa (75 mTorr) is achieved, the pretreatment is judged to be completed.

(ii) Measurement

Specific surface area measurement is performed with BELSORP-minill manufactured by MicrotracBEL Corp. by a nitrogen adsorption method at liquid nitrogen temperature. A nitrogen introduction amount is set in the "easy mode" of the apparatus, and a target relative pressure is set to 0.10, 0.15, 0.20, 0.25, or 0.30.

(iii) Analysis

BEL Master was used as analysis software. An analysis method is in conformity with JIS Z 8830:2013, and the specific surface area S is calculated through use of four or more measurement results at higher relative pressures by a BET multipoint method.

In one embodiment, for example, potassium carbonate having the following values, which are obtained by the above-mentioned measurements, may be used as the potassium carbonate: a bulk density of 0.90 [g/ml], an average particle diameter D of 460 [μm], a specific surface area S of 1.51 [m$^2$/g], and a ratio D/S of 305.

In one embodiment, the reaction mixture contains an alkali metal salt, such as: any alkali metal carbonate other than the potassium carbonate; or an alkali metal hydrogen carbonate. Such alkali metal salt may be used in combination with the potassium carbonate. For example, the potassium carbonate and sodium carbonate may be used in combination.

Examples of the alkali metal carbonate include lithium carbonate, rubidium carbonate, and cesium carbonate.

Examples of the alkali metal hydrogen carbonate that may be used in combination with the potassium carbonate include lithium hydrogen carbonate, sodium hydrogen carbonate, potassium hydrogen carbonate, rubidium hydrogen carbonate, and cesium hydrogen carbonate.

Those alkali metal salts may be used alone or in combination thereof.

The total concentration of the alkali metal salts (including the potassium carbonate and the above-mentioned other alkali metal salt) in the reaction mixture is not particularly limited.

In one embodiment, the total blending amount of the alkali metal salts in the reaction mixture is 100 parts by mol or more with respect to 100 parts by mol of hydroquinone to be blended into the reaction mixture, and is 180 parts by mol or less, 160 parts by mol or less, 140 parts by mol or less, or 120 parts by mol or less with respect thereto. When the total blending amount of the alkali metal salts is 100 parts by mol or more, a reaction time can be shortened. When the total blending amount of the alkali metal salts is 180 parts by mol or less, the production of a gel component can be suppressed. In addition, the total blending amount of the alkali metal salts in the reaction mixture is, for example, 100 parts by mol to 180 parts by mol, preferably 100 parts by mol to 140 parts by mol, more preferably 100 parts by mol to 120 parts by mol with respect to 100 parts by mol of hydroquinone to be blended into the reaction mixture.

In one embodiment, the potassium carbonate is blended as an alkali metal salt in the above-mentioned blending amount.

In one embodiment, the reaction mixture is free of any of sodium fluoride, potassium fluoride, rubidium fluoride, or cesium fluoride. In this aspect, even when none of those compounds is incorporated, a PEEK having a high molecular weight can be obtained. In addition, when none of those compounds is incorporated, the remaining of those compounds in the PEEK to be obtained can be avoided, and hence purification cost can be reduced. Thus, a PEEK having a high crystallization temperature Tc can be produced at low cost.

A molar ratio ([DCBP]:[HQ]) between 4,4'-dichlorobenzophenone (DCBP) and hydroquinone (HQ) to be subjected to the reaction is not particularly limited.

The molar ratio ([DCBP]:[HQ]) may be appropriately adjusted for the purpose of, for example, controlling the molecular weight of the PEEK to be obtained.

In one embodiment, the molar ratio ([DCBP]:[HQ]) is 47.5:52.5 to 52.5:47.5, 48.0:52.0 to 52.0:48.0, 48.5:51.5 to 51.5:48.5, 49.0:51.0 to 51.0:49.0, or 49.5:50.5 to 50.5:49.5.

The number of moles of 4,4'-dichlorobenzophenone (DCBP) may be larger than, smaller than, or identical to the number of moles of hydroquinone (HQ).

In one embodiment, the total concentration (on a blending amount basis) of 4,4'-dichlorobenzophenone and hydroquinone in the reaction mixture is not particularly limited, and is, for example, 1.0 mol/l or more, 1.2 mol/l or more, 1.3 mol/l or more, 1.4 mol/l or more, or 1.5 mol/l or more, and is 6.0 mol/l or less, 5.0 mol/l or less, or 4.0 mol/l or less. In addition, the total concentration (on a blending amount basis) of 4,4'-dichlorobenzophenone and hydroquinone in the reaction mixture is, for example, 1.0 mol/l to 6.0 mol/l, preferably 1.3 mol/l to 5.0 mol/l, more preferably 1.5 mol/l to 4.0 mol/l.

In one embodiment, no monomer other than 4,4'-dichlorobenzophenone and hydroquinone is used as a monomer to be subjected to the above-mentioned reaction.

In one embodiment, any monomer other than 4,4'-dichlorobenzophenone and hydroquinone is used in combination in the above-mentioned reaction to the extent that the effect of the present invention is not impaired.

In one embodiment, the total ratio (mass %) of 4,4'-dichlorobenzophenone and hydroquinone is 50 mass % or more, 60 mass % or more, 70 mass % or more, 80 mass % or more, 90 mass % or more, 95 mass % or more, 97 mass % or more, 99 mass % or more, 99.5 mass % or more, or 100 mass % with respect to all the monomers to be subjected to the reaction.

In this aspect, the volume of the reaction mixture is not particularly limited.

In one embodiment, the volume of the reaction mixture is 0.1 l or more, 0.2 l or more, 0.3 l or more, 0.5 l or more, 1 l or more, 2 l or more, 5 l or more, or 10 l or more. The upper limit of the volume is not particularly limited.

In one embodiment, 70 mass % or more, 80 mass % or more, 90 mass % or more, 95 mass % or more, 99 mass % or more, 99.5 mass % or more, 99.9 mass % or more, or substantially 100 mass % of the reaction mixture at the time of the start of the reaction is formed of:

4,4'-dichlorobenzophenone, hydroquinone, an alkali metal salt, and the solvent;

4,4'-dichlorobenzophenone, hydroquinone, one or more of alkali metal salts selected from the group consisting of: potassium carbonate; and sodium carbonate, and diphenyl sulfone; or 4,4'-dichlorobenzophenone, hydroquinone, potassium carbonate, and diphenyl sulfone.

When "substantially 100 mass %" of the mixture is formed of those materials, the mixture may contain an inevitable impurity.

The reaction between 4,4'-dichlorobenzophenone and hydroquinone can be performed in an inert gas atmosphere. The inert gas is not particularly limited, and examples thereof comprise nitrogen and an argon gas.

EXAMPLES

Examples of the present invention are described below, but the present invention is not limited by these Examples.

Example 1

40.572 g (0.162 mol) of 4,4'-dichlorobenzophenone, 17.787 g (0.162 mol) of hydroquinone, 25.699 g (0.186 mol) of potassium carbonate, and 139.60 g of diphenyl sulfone were loaded into a 300-milliliter four-necked flask including a stirring machine, a temperature gauge, a nitrogen-introducing tube, a cooling tube, and a water recovery vessel connected thereto, and a nitrogen gas was flowed therein.

The reaction mixture was subjected to a reaction under the following temperature control.

<Temperature Control>

(1) The temperature of the reaction mixture is increased to 150° C., and then the temperature thereof is increased to 200° C. over 30 minutes.
(2) The mixture is held at 200° C. for 1 hour.
(3) The temperature is increased from 200° C. to 250° C. over 30 minutes.
(4) The mixture is held at 250° C. for 1 hour.
(5) The temperature is increased from 250° C. to 260° C. over 30 minutes.
(6) The mixture is held at 260° C. for 2 hours.

After the completion of the reaction, the product was pulverized with a blender (7010HS manufactured by Waring), and was washed with acetone and water in the stated order, followed by drying with a dryer at 180° C. Thus, a powdery PEEK was obtained.

The resultant PEEK was subjected to the following measurements (1) to (4).

(1) Melt Flow Index (MI)

The melt flow index of the PEEK was measured with a melt indexer (L-227) manufactured by Tateyama Kagaku High-Technologies Co., Ltd. in conformity with ASTM D 1238-13 at a resin temperature of 380° C. and a load of 2.16 kg.

(2) Differential Scanning Calorimetry (DSC)

5 mg of the PEEK was weighed in an aluminum-made pan, and was subjected to temperature scanning measurement with a differential scanning calorimeter ("DSC8500" manufactured by PerkinElmer Co., Ltd.). The temperature scanning was performed in the following order: the temperature of the PEEK was increased from 20° C. to 420° C. at 20° C./min; and the temperature thereof was decreased from 420° C. to 20° C. at -20° C./min. The crystallization temperature Tc of the PEEK was determined by reading the exothermic peak of the crystallization thereof observed at the time of the temperature decrease.

(3) Combustion Ion Chromatography

A fluorine atom content a and a chlorine atom content b in the PEEK were measured by combustion ion chromatography.

Specifically, the sample was introduced into a combustion furnace, and was combusted in a combustion gas containing oxygen, followed by the collection of a generated gas in an absorbing liquid. After that, the absorbing liquid was subjected to separation and quantification with an ion chromatograph. A quantitative value was determined on the basis of a calibration curve produced from a reference having a known concentration. Measurement conditions are described below.
<Sample Combustion>
Combustion apparatus: AQF-2100H manufactured by Mitsubishi Chemical Analytech Co., Ltd.
Combustion furnace preset temperature: 800° C. on the front stage and 1,100° C. on the rear stage
Argon flow rate: 400 ml/min
Oxygen flow rate: 200 ml/min
Absorbing liquid: A hydrogen peroxide solution
<Ion Chromatograph>
Analyzer: Integrion manufactured by Thermo Fisher Scientific, Inc.
Column: A guard column (Dionex IonPac AG12A) and a separation column (Dionex IonPac AS12A) are used while being linked to each other (both the columns are manufactured by DIONEX).
Eluent: $Na_2CO_3$ (2.7 mmol/l)+$NaHCO_3$ (0.3 mmol/l)
Flow rate: 1.5 ml/min
Column temperature: 30° C.
Measurement mode: A suppressor system
Detector: An electric conductivity detector The detection limit of each of a fluorine atom and a chlorine atom in the above-mentioned measurement method is 2 mg/kg. When the contents of those atoms are less than the detection limit, the contents are each represented as "<2" (mg/kg) in Table 1 (the same holds true for Table 2 subsequent thereto).

(4) Reduced Viscosity $\eta_{sp}/c$

The reduced viscosity $\eta_{sp}/c$ of a solution, which was obtained by dissolving the PEEK in concentrated sulfuric acid (purity: 95 mass % or more) so that its concentration became 0.1 g/dl, was measured at 25° C. with an Ubbelohde viscometer in conformity with JIS K 7367-5:2000.

The foregoing results are shown in Table 1.

Example 2

A powdery PEEK was obtained in the same manner as in Example 1 except that in Example 1, the temperature control was changed to the following. The resultant PEEK was subjected to the same measurements as those of Example 1. The results are shown in Table 1.
<Temperature Control>
(1) The temperature of the reaction mixture is increased to 150° C., and then the temperature thereof is increased to 200° C. over 30 minutes.
(2) The mixture is held at 200° C. for 1 hour.
(3) The temperature is increased from 200° C. to 250° C. over 30 minutes.
(4) The mixture is held at 250° C. for 1 hour.
(5) The temperature is increased from 250° C. to 280° C. over 30 minutes.
(6) The mixture is held at 280° C. for 2 hours.

Example 3

A powdery PEEK was obtained in the same manner as in Example 1 except that in Example 1, the temperature control was changed to the following. The resultant PEEK was subjected to the same measurements as those of Example 1. The results are shown in Table 1.
<Temperature Control>
(1) The temperature of the reaction mixture is increased to 150° C., and then the temperature thereof is increased to 200° C. over 30 minutes.
(2) The mixture is held at 200° C. for 1 hour.
(3) The temperature is increased from 200° C. to 250° C. over 30 minutes.
(4) The mixture is held at 250° C. for 1 hour.
(5) The temperature is increased from 250° C. to 300° C. over 30 minutes.
(6) The mixture is held at 300° C. for 2 hours.

Example 4

A powdery PEEK was obtained in the same manner as in Example 1 except that in Example 1, the temperature control was changed to the following. The resultant PEEK was subjected to the same measurements as those of Example 1. The results are shown in Table 1.
<Temperature Control>
(1) The temperature of the reaction mixture is increased to 150° C., and then the temperature thereof is increased to 200° C. over 30 minutes.
(2) The mixture is held at 200° C. for 1 hour.
(3) The temperature is increased from 200° C. to 250° C. over 30 minutes.
(4) The mixture is held at 250° C. for 1 hour.
(5) The temperature is increased from 250° C. to 320° C. over 30 minutes.
(6) The mixture is held at 320° C. for 2 hours.

Comparative Example 1

A powdery PEEK was obtained in the same manner as in Example 1 except that in Example 1, the temperature control was changed to the following. The resultant PEEK was subjected to the same measurements as those of Example 1. The results are shown in Table 1.
<Temperature Control>
(1) The temperature of the reaction mixture is increased to 150° C., and then the temperature thereof is increased to 200° C. over 30 minutes.
(2) The mixture is held at 200° C. for 1 hour.
(3) The temperature is increased from 200° C. to 250° C. over 30 minutes.
(4) The mixture is held at 250° C. for 1 hour.
(5) The temperature is increased from 250° C. to 340° C. over 30 minutes.
(6) The mixture is held at 340° C. for 2 hours.

TABLE 1

| | Example 1 | Example 2 | Example 3 | Example 4 | Comparative Example 1 |
|---|---|---|---|---|---|
| Highest temperature of reaction mixture [° C.] | 260 | 280 | 300 | 320 | 340 |
| MI [g/10 min] | 1360 | 0.3 | 0.001 | 0.03 | 31 |
| Crystallization temperature Tc [° C.] | 275 | 270 | 257 | 261 | 254 |
| Fluorine atom content [mg/kg] | <2 | <2 | <2 | <2 | <2 |

TABLE 1-continued

|  | Example 1 | Example 2 | Example 3 | Example 4 | Comparative-Example 1 |
|---|---|---|---|---|---|
| Chlorine atom content [mg/kg] | 7400 | 2700 | 1100 | 670 | 600 |
| Reduced viscosity $\eta_{sp/c}$ [dl/g] | 0.34 | 0.85 | 1.34 | 1.00 | 0.60 |

<Evaluation>

It is understood from Table 1 that the method for producing a PEEK according to the present invention provides a PEEK having a high crystallization temperature Tc (specifically, 255° C. or more). In addition, it is understood that as the highest temperature of the reaction mixture becomes closer to 300° C., the melt flow index (MI) of the PEEK reduces, and hence the molecular weight of the PEEK increases.

Example 5

41.224 g (0.164 mol) of 4,4'-dichlorobenzophenone, 17.803 g (0.162 mol) of hydroquinone, 25.717 g (0.186 mol) of potassium carbonate, and 140.00 g of diphenyl sulfone were loaded into a 300-milliliter four-necked flask including a stirring machine, a temperature gauge, a nitrogen-introducing tube, a cooling tube, and a water recovery vessel connected thereto, and a nitrogen gas was flowed therein.

The reaction mixture was subjected to a reaction under the following temperature control.

<Temperature Control>
(1) The temperature of the reaction mixture is increased to 150° C., and then the temperature thereof is increased to 200° C. over 30 minutes.
(2) The mixture is held at 200° C. for 1 hour.
(3) The temperature is increased from 200° C. to 250° C. over 30 minutes.
(4) The mixture is held at 250° C. for 1 hour.
(5) The temperature is increased from 250° C. to 280° C. over 30 minutes.
(6) The mixture is held at 280° C. for 2 hours.

After the completion of the reaction, the product was pulverized with a blender (7010HS manufactured by Waring), and was washed with acetone and water in the stated order, followed by drying with a dryer at 180° C. Thus, a powdery PEEK was obtained.

The resultant PEEK was subjected to the same measurements as those of Example 1 and to the following tensile strength measurement.

<Tensile Strength>

The PEEK was subjected to press molding into a thickness of 2 mm with a vacuum press manufactured by Imoto Machinery Co., Ltd. at 380° C., and was annealed at 200° C. to provide a press-molded plate. The press-molded plate was cut into a dumbbell 5A shape specified in JIS K 7161 to be used as a test piece. The tensile strength of the resultant test piece was measured by subjecting the test piece to a tensile test at a test speed of 5 mm/min and a chuck-to-chuck distance of 50 mm.

The foregoing results are shown in Table 2.

Example 6

A powdery PEEK was obtained in the same manner as in Example 5 except that in Example 5, the temperature control was changed to the following. The resultant PEEK was subjected to the same measurements as those of Example 5. The results are shown in Table 2.

<Temperature Control>
(1) The temperature of the reaction mixture is increased to 150° C., and then the temperature thereof is increased to 200° C. over 30 minutes.
(2) The mixture is held at 200° C. for 1 hour.
(3) The temperature is increased from 200° C. to 250° C. over 30 minutes.
(4) The mixture is held at 250° C. for 1 hour.
(5) The temperature is increased from 250° C. to 300° C. over 30 minutes.
(6) The mixture is held at 300° C. for 2 hours.

The result obtained by subjecting the PEEK obtained in Comparative Example 1 described above to the above-mentioned tensile strength measurement is also shown in Table 2.

TABLE 2

|  | Example 5 | Example 6 | Comparative Example 1 |
|---|---|---|---|
| Highest temperature of reaction mixture [° C.] | 280 | 300 | 340 |
| MI [g/10 min] | 51 | 34 | 31 |
| Crystallization temperature Tc [° C.] | 273 | 267 | 254 |
| Fluorine atom content [mg/kg] | <2 | <2 | <2 |
| Chlorine atom content [mg/kg] | 5600 | 4500 | 600 |
| Reduced viscosity $\eta_{sp/c}$ [dl/g] | 0.45 | 0.59 | 0.60 |
| Tensile strength [MPa] | 66 | 75 | 47 |

<Evaluation>

It is understood from Table 2 that a PEEK having a high crystallization temperature Tc shows a tendency in that the PEEK is excellent in tensile strength.

Some embodiments and/or Examples of the present invention are described in detail above, but a person skilled in the art could easily make various modifications to these illustrative embodiments and/or Examples without substantially departing from the novel teachings and effects of the present invention. Accordingly, those various modifications are encompassed in the scope of the present invention.

The invention claimed is:

1. A polyether ether ketone, comprising a repeating unit represented by the following formula (1), having a crystallization temperature Tc of 270° C. or more, and satisfying one or both of the following conditions (A) and (B):

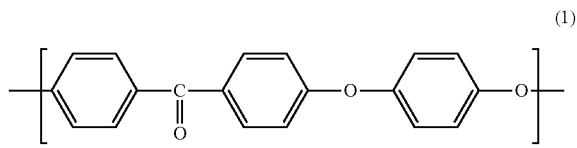

(A) a fluorine atom content a is less than 2 mg/kg; and
(B) a chlorine atom content b is 2 mg/kg or more.

2. The polyether ether ketone according to claim 1, wherein a raw material of the polyether ether ketone comprises 4,4'-dichlorobenzophenone.

3. The polyether ether ketone according to claim 1, having a melt flow index of 100 g/10 min or less.

4. The polyether ether ketone according to claim 1, having a reduced viscosity $\eta_{sp}/c$ of 0.40 dl/g to 1.50 dl/g.

5. A method for producing a polyether ether ketone according to claim 1, which comprises reacting 4,4'-dichlorobenzophenone and hydroquinone under a condition in which a highest temperature of a reaction mixture is 260° C. to 280° C.

6. The method for producing a polyether ether ketone according to claim 5, further comprising increasing a temperature of the reaction mixture to 150° C. or more, followed by holding of the temperature.

7. The method for producing a polyether ether ketone according to claim 5, further comprising increasing a temperature of the reaction mixture to 150° C. or more, followed by repetition of an increase of the temperature and holding of the temperature a plurality of times.

8. The method for producing a polyether ether ketone according to claim 5, further comprising holding the reaction mixture at 180° C. to 220° C. for 0.5 hour to 2 hours.

9. The method for producing a polyether ether ketone according to claim 5, further comprising holding the reaction mixture at 230° C. to 270° C. for 0.5 hour to 2 hours.

10. The method for producing a polyether ether ketone according to claim 5, further comprising holding the reaction mixture at 280° C. for 1 hour to 8 hours.

11. The method for producing a polyether ether ketone according to claim 5, wherein a time period from a time point at which a temperature of the reaction mixture reaches 150° C. to a time point at which the temperature reaches the highest temperature is 2.0 hours to 10 hours.

12. The method for producing a polyether ether ketone according to claim 5, wherein the polyether ether ketone to be produced has a crystallization temperature Tc of 270° C. or more.

13. The method for producing a polyether ether ketone according to claim 5, wherein the polyether ether ketone to be produced has a melt flow index of 100 g/10 min or less.

14. The method for producing a polyether ether ketone according to claim 5, wherein the polyether ether ketone to be produced has a reduced viscosity $\eta_{sp}/c$ of 0.40 dl/g to 1.00 dl/g.

15. The method for producing a polyether ether ketone according to claim 5, wherein the reaction mixture contains only one kind of solvent as a solvent.

16. The method for producing a polyether ether ketone according to claim 5, wherein the reaction mixture is free of any of sodium fluoride, potassium fluoride, rubidium fluoride, or cesium fluoride.

* * * * *